Jan. 28, 1941.  O. E. ESVAL ET AL  2,229,645

ELECTROMAGNETIC ERECTING MEANS FOR GYROSCOPES

Original Filed Feb. 15, 1936  3 Sheets-Sheet 1

INVENTORS
ORLAND E. ESVAL AND
CARL A. FRISCHE
BY Herbert H. Thompson
THEIR ATTORNEY.

Jan. 28, 1941.    O. E. ESVAL ET AL    2,229,645
ELECTROMAGNETIC ERECTING MEANS FOR GYROSCOPES
Original Filed Feb. 15, 1936    3 Sheets-Sheet 2
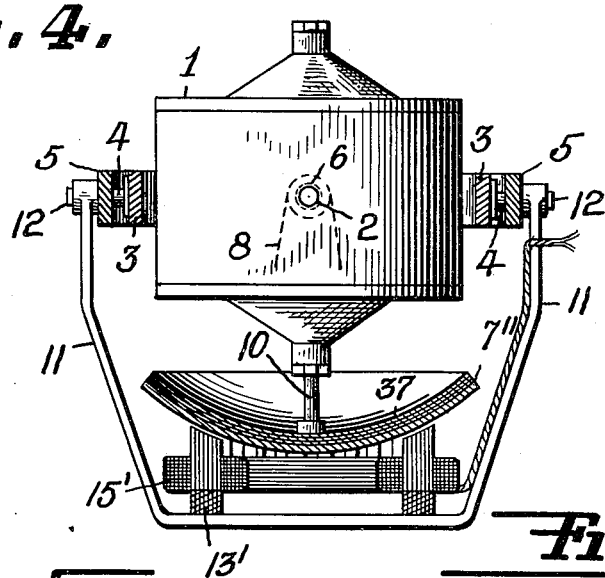
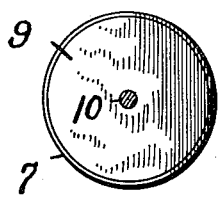
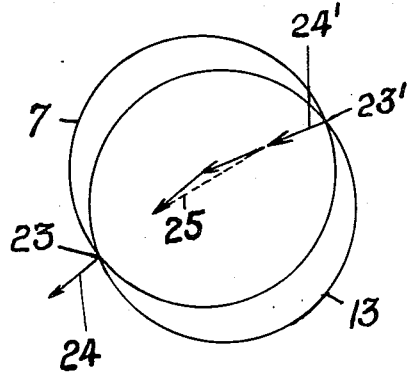
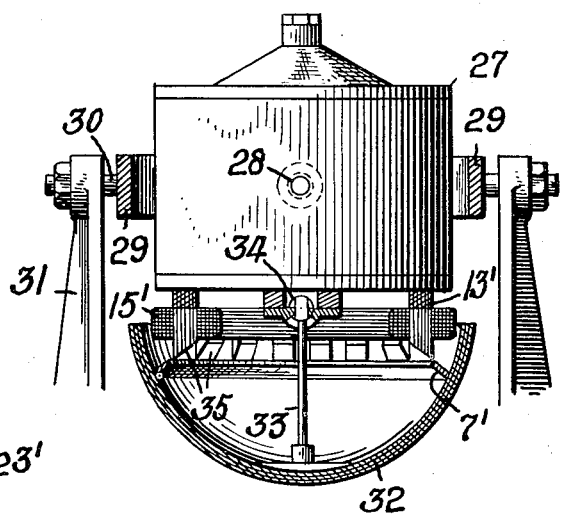
INVENTORS
ORLAND E. ESVAL &
CARL A. FRISCHE
BY
Herbert N. Thompson
THEIR ATTORNEY Jan. 28, 1941.        O. E. ESVAL ET AL        2,229,645
ELECTROMAGNETIC ERECTING MEANS FOR GYROSCOPES
Original Filed Feb. 15, 1936      3 Sheets-Sheet 3

INVENTORS
ORLAND E. ESVAL
CARL A. FRISCHE
BY Herbert H. Thompson
THEIR ATTORNEY.

Patented Jan. 28, 1941

2,229,645

UNITED STATES PATENT OFFICE 2,229,645

ELECTROMAGNETIC ERECTING MEANS FOR GYROSCOPES

Orland E. Esval, Summit, and Carl A. Frische, Leonia, N. J., assignors to Sperry Gyroscope Company, Inc., Brooklyn, N. Y., a corporation of New York Application February 15, 1936, Serial No. 64,004
Renewed April 12, 1940

11 Claims. (Cl. 74—5)

This invention relates, generally, to gyroscopes such as those employed for providing an artificial horizon or a gyro vertical for aircraft or other dirigible craft, and the invention has reference, more particularly, to a gyroscope of the above character having electromagnetic means for erecting or positioning the same.

Heretofore, in erecting or positioning gyroscopes it has been common to employ air under pressure which is suitably directed for flow through jets and controlled by the use of pendulous shutters or other gravitationally controlled members normally closing or partially closing the jets and moving to open the same in response to the tilting or departure of the gyroscope from its desired position. The use of air for this purpose has certain drawbacks and a supply of air under pressure is not always available for electrically driven gyroscopes, and in such case it is necessary to put an air impeller on the gyro. Also, owing to friction of the shutter bearings, the pneumatic type of erecting or positioning means does not respond to minute changes of tilt and hence is not as sensitive as might be desired.

The principal object of the present invention is to provide novel electromagnetically operable means adapted for erecting or positioning gyroscopes, the said means being extremely sensitive, accurate and dependable in operation.

Another object of the present invention lies in the provision of a novel means of the above character, wherein a portion thereof is arranged to produce a moving magnetic field for acting upon an inductor to effect the precessing of the gyro to desired position in the event the gyro should tilt from such position.

Still another object of the present invention is to provide a novel mechanism of the above character, wherein the inductor is independently mounted with respect to the means for producing the moving magnetic field, the reaction between the inductor and said means serving to produce a torque on the sensitive element of the gyroscope in a plane at right angles to the plane of the tilted gyro axis and the true vertical, and in such direction as to cause the gyroscope to precess to the true vertical.

Other objects and advantages will become apparent from the specification, taken in connection with the accompanying drawings wherein the invention is embodied in concrete form.

In the drawings,

Fig. 3 is a view similar to Fig. 1, but of a somewhat modified construction.

Fig. 4 is a view similar to Fig. 1, but of another modified construction.

Fig. 5 is a plan view of the inductor ring of Fig. 1.

Figure 1:
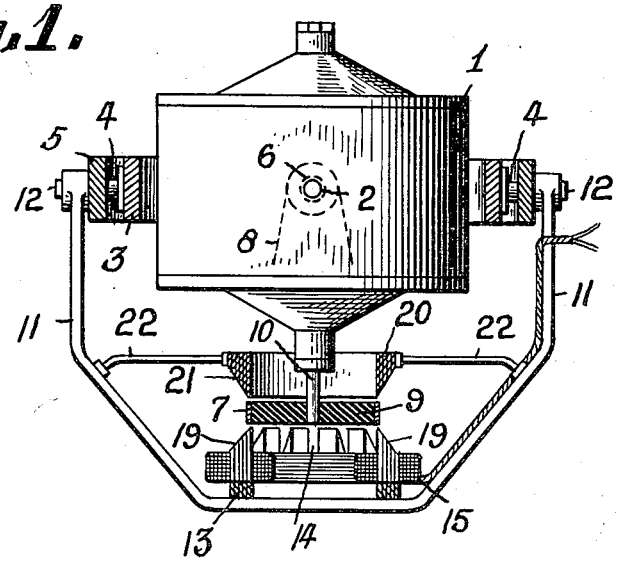
Fig. 1 is an elevational view, partly in section, of a gyroscope provided with the novel erecting means of this invention.

Fig. 5—A is a force diagram illustrating the operation of the system of Fig. 1.

Figure 6:
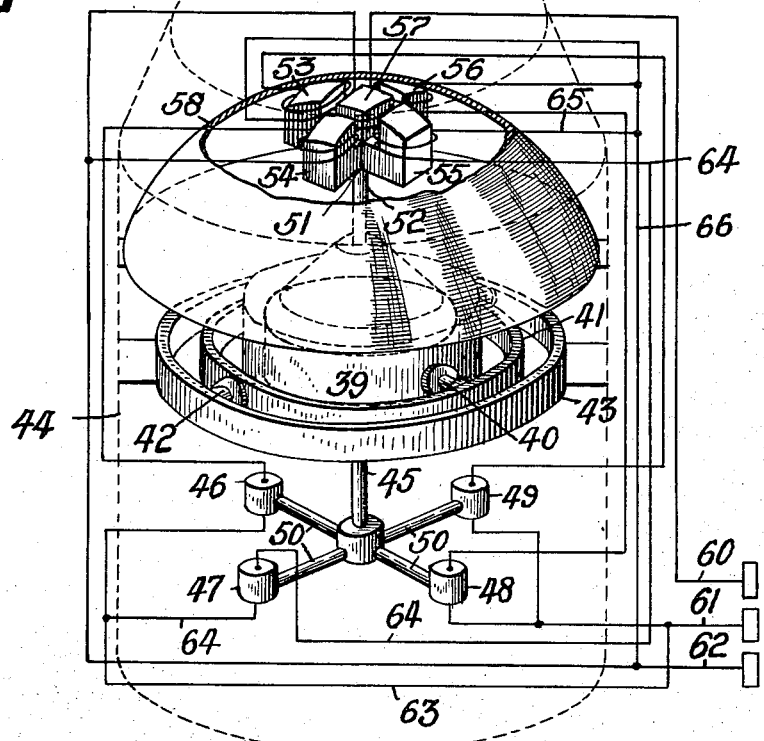
Figure 7:
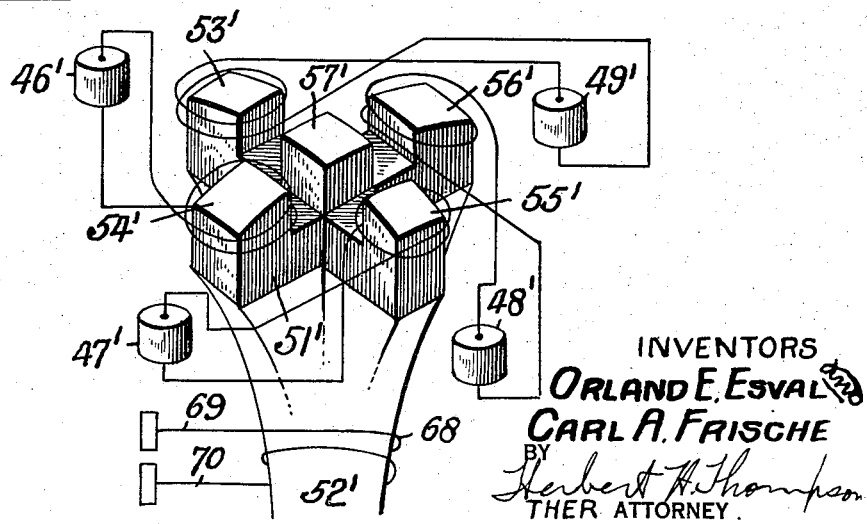

Fig. 6 is a schematic perspective view, partly broken away, of another modified construction, and Fig. 7 is a schematic fragmentary perspective view of a slight modification of the structure of Fig. 6.

Similar characters of reference are used in the above views to indicate corresponding parts.

Figure 2:
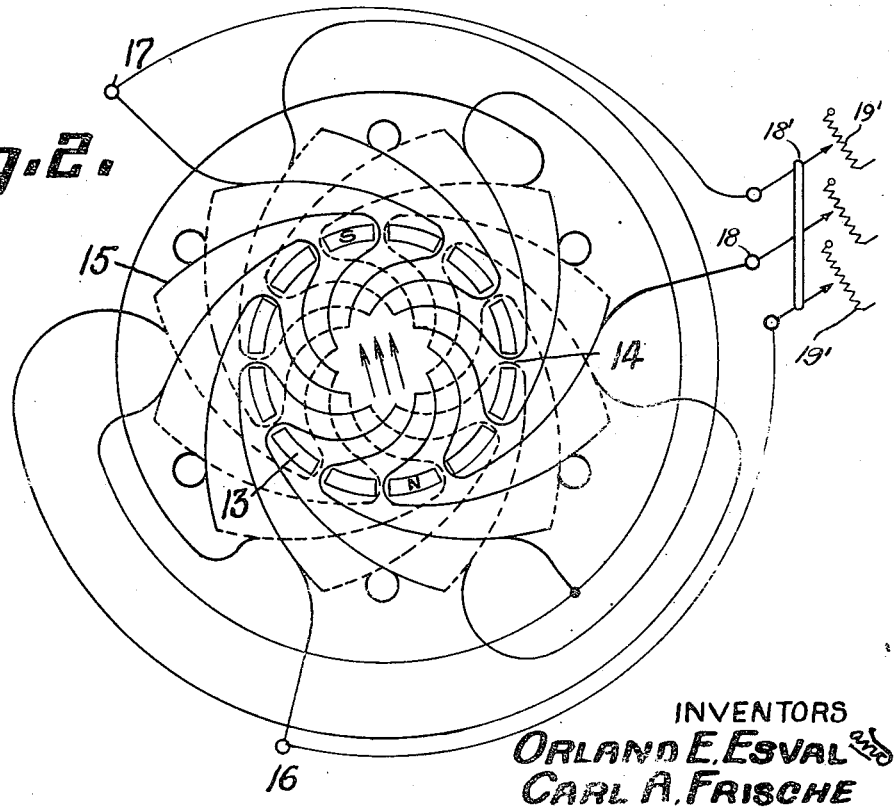
Fig. 2 is a wiring diagram of the magnetic field producing portion of the erecting means.

Referring now to Figs. 1, 2, 5 and 5—A of the drawings, illustrating a typical form of the invention, the reference numeral 1 designates a bearing casing having a gyroscope rotor rotatable therewithin about a vertical axis, the said rotor being ordinarily electrically driven in a manner well known to those skilled in the art, although other driving means, such as air, may be used. The casing is universally mounted about horizontal axes by providing the rotor bearing casing with horizontal pivots, of which one is shown at 2, rotatably mounted preferably by means of antifriction bearings in a gimbal ring 3 which, in turn, is similarly mounted for oscillation or rotation about horizontal pivots 4 at right angles to the pivots 2.

According to this arrangement of the invention, an inductor 7 having the form of an annulus or ring of electrically conducting, though nonmagnetic, material such as copper or aluminum, is carried by the gyro casing 1. This inductor is of relatively small cross-section and is illustrated as secured to the periphery of a disc 9 of electrically insulating material, such as a phenolic condensation product, which disc in turn is carried by a stem 10 depending from the gyro casing. The axis of inductor 7 is concentric with the rotor spin axis but does not rotate therewith. The gyro casing 1, together with its contained rotor and the depending inductor 7 taken as a unit, is preferably substantially balanced about both horizontal axes about which casing 1 is universally mounted, i. e., the center of gravity of casing 1 and its contents together with that of the supported inductor, lies preferably substantially at the point of intersection of axes passing through pivots 2 and 4. A slight amount of pendulousness may be employed to correct for errors due to friction in the trunnions, but appreciable pendulosity of the gyro is undesirable, particularly where the device is to be used for aircraft, since in operation during the turning or other maneuvering of the craft giving rise to acceleration forces, an oscillation of the gyroscope is apt to be set up, which is obviously undesirable. Therefore, it is preferable to employ a substantially non-pendulous gyroscope and to impart gravitational control thereto by means of a magnetic flux field acting on inductor 7, thereby directly reducing any inclination of the gyro without setting up oscillations.

The pivots 4 are carried by a second gimbal ring 5 that in turn is pivotally mounted by pivots 6 on standards 8 forming a part of the frame of the instrument, the axis of said pivots 6 being coincident with that of pivots 2. A depending U-shaped frame member 11 is pivoted on pivots 12 carried by ring 5 and aligned with pivots 4. Frame member 11 carries a laminated stator ring 13 provided with slots 14 for accommodating a winding 15 that is preferably wound similarly to an induction motor stator. In Fig. 2 of the drawings, the winding 15 is illustrated as a two layer, three phase, two pole lap type connected winding, three phase current being supplied to terminals 16, 17 and 18 of the winding to produce a rotating magnetic field having a speed of rotation depending on the supply frequency.

The stator member consisting of ring 13 and winding 15 is so supported by frame 11 that its central axis coincides with that of inductor 7 and the gyro spin axis when the latter is vertical, as shown in Fig. 1. It will be noted that the stator member is supported pendulously on the same gimbal axis as the gyroscope, but is independent of the latter and hence, due to its weight, is normally positioned with its central axis vertical. The stator ring 13 has its upper outer peripheral edge portion beveled at 19 so as to confine the flux to a narrow annular path passing through the inductor ring 7. Positioned above the inductor 7 is an annular laminated core 20 for providing a convenient path for the flux emanating from the stator member. The lower outer peripheral edge portion 21 of core 20 is also shown beveled to aid in confining the flux to an annular path passing through the inductor 9 when the inductor axis and the stator axis are aligned. The central axis of core 20 is coincident with the axis of ring 13 and this core is carried as by arms 22 secured to the depending frame member 11.

In use, in the absence of accelerating forces, the center line of the stator member is in the true vertical and the flux produced in the same emanates from one instantaneous pole thereof and re-enters the opposite pole spaced 180° away, as illustrated schematically in Fig. 2 by N—S and the arrows, the poles, however, continuously moving around the stator ring. The flux actually passes from a portion of the stator ring up through inductor 7 into the core 20, around this core, and leaves the same at the diametrically opposite point to pass down through inductor 7 and enter a portion of the stator ring diametrically opposite the portion from which it emanated. Thus, with the gyro axis vertical, the rotating flux of the stator member is not looped by the inductor 7 and no currents encircling the inductor are induced in the latter due to the flux rotation. Therefore no displacing force acts upon the inductor although a slight torque may be exerted about the axis of the same, i. e., about the spinning axis of the gyro due to eddy currents in the inductor ring, but by making this ring of small cross section this torque is rendered negligible and in any event is absorbed by the gyro gimbal bearings without causing any precession of the gyro. If desired, the inductor 7 may be made up of a plurality of annular wires or rings of small cross section electrically insulated from each other as by coating the same with varnish, thereby eliminating eddy currents. In fact, the inductor 7 may have the form of a short circuited coil to obtain the desired end.

Should the gyro tilt for any reason, the inductor ring 7 loops the flux, producing currents in the same, and a force is exerted upon the inductor at right angles to the axis of inclination and in the proper direction to directly eliminate the tilt, the magnitude of the force varying with a predetermined function of the tilt. This will be apparent from an inspection of Fig. 5—A, wherein the stator ring 13 is shown schematically in plan by a circle with which the circle representing the inductor 7 no longer registers since the gyro has tilted, the tilt of the gyro being assumed as causing inductor 7 to move upwardly and toward the left in this figure. The flux from 13 now intersects inductor 7 at two points 23 and 23' and the forces exerted upon the inductor 7, as a result of this flux and the currents produced thereby in the inductor, are indicated by the arrows 24 and 24', the line of each of said forces extending through the center of the inductor 7. Applying these forces at the center of inductor 7 lying in the gyro axis and combining the forces, a resultant force 25 is produced, acting substantially at right angles to the axis of the gyro and at right angles to the direction of the tilt. Assuming the gyro rotor to be turning counter-clockwise as viewed from the top, i. e., in the same direction as the direction of rotation of the magnetic field, the resultant force 25 causes the gyro to precess to directly correct for the tilt as is desired.

It will be apparent that since the magnitude of the precessing force is dependent upon the magnitude of the linking flux, and hence upon the current in winding 15, the rate of precession may be varied at will by varying the current supply to winding 15. This is illustrated in Fig. 2 by resistances 19' in connection with rheostat switch 18'. Thus, it is easily possible to control the shape of the precessing curve, i. e., the curve of displacement with respect to time, and hence the rate of precession at various displacements, thereby giving this type of tilt correcting means great flexibility in use. Preferably, the period of precession is relatively long in comparison to the period of movement of the pendulous stator member 13—15 resulting from accelerating forces such as those occurring during aircraft operation, whereby the gyro is substantially unaffected by such accelerating forces.

It will be understood that the stator may be wound so as to be energized from any polyphase supply instead of the three-phase supply illustrated, if desired, and in fact any source of A. C. supply may be used and the rotating field may be produced by introducing quadrature components of the flux in the stator by using shading poles, split phase, etc., as will be understood by those skilled in the art.

The form of the invention shown in Fig. 3 is similar to that previously described, with the exception that the positions of the stator member and inductor are reversed, the latter being pendulously supported from the gyro rotor bearing casing 27. Casing 27 is universally mounted about horizontal axes by means of pivots 28, gimbal ring 29 and pivots 30 carried by standards 31. The stator ring 13' carrying winding 15' is attached to the bottom of the casing 27 and the inductor ring 7', of the same material as inductor 7 of Fig. 1, is secured to a laminated hollow hemi-spherical core member 32 of magnetic conducting material such as soft iron, said core member being pendulously supported by means of a stem 33 and universal joint 34 attached to the bottom of casing 27 on the gyro spin axis. The lower inner peripheral edge portion of stator ring 13' is beveled at 35 to concentrate the flux upon the inductor 7', the flux path being from one momentary pole of the ring 13' through inductor 7', core 32, back through inductor 7' to the other pole of the ring 13'. As long as the gyro spin axis is vertical, the inductor 7' is concentric with the stator ring 13' and a slight torque concentric to the spin axis is transmitted through joint 34 and casing 27 to the gimbal pivots without causing precession. When the gyro tilts, however, the stem 33, remaining vertical, causes inductor 7' to loop the flux, thereby producing a force between the inductor and the stator to cause the latter to precess to the vertical.

The form of the invention shown in Fig. 4 is very similar to that of Fig. 1 and corresponding parts are similarly numbered. In this form of the invention, however, the inductor 7", of the same material as inductor 7, has the form of a semi-spherical hollow member preferably backed by a laminated core 37 of magnetic conducting material such as soft iron, the whole being carried by the stem 10 secured to casing 1. The top of the stator ring 13' is shown beveled to conform to the curvature of the inductor 7" so as to be positioned as close to the latter as possible.

In use, with the gyro axis vertical, the rotating flux cuts the inductor 7", producing a torque therein that is concentric with the spinning axis and is taken up by the gimbal bearings without causing precession. Should the gyro axis tilt, however, the couple exerted upon the inductor 7" may be resolved into two components, one concentric with the gyro spin axis, which has no effect, and the other at right angles thereto, this latter couple serving to precess the gyro directly to the vertical. The greater the degree of tilt of the gyro axis, the greater will be the magnitude of this latter precessing couple, provided the current in winding 15 is not varied. Obviously, by varying the current flow in winding 15 any desired erecting couple may be produced.

In the form of the invention shown in Fig. 6, the gyro casing 39 is universally mounted about horizontal axes by means of pivots 40, gimbal ring 41 and pivots 42 shown as carried by a ring or support 43 fixed to the instrument housing 44. In this case a different form of gravitational controller is used, i. e., a liquid level device instead of a pendulum. Suspended from the gyro casing 39 by means of a stem 45 and tubes 50 are four mercury contact pots or switches 46 to 49. Tubes 50 serve to interconnect the several pots 46 to 49 so that mercury can flow by gravity from higher to lower pots. The contacts of pots 46 to 49 are open as long as the gyro axis is truly vertical, but as soon as the gyro tilts, mercury flowing into the lowermost pot closes the contacts of such pot to thereby complete a circuit as will further appear.

A five pole stator member 51 is carried by a stem 52 projecting upwardly from the gyro casing 39. The poles 53 to 57 of the stator member have their upper ends curved so as to lie in a spherical surface having the intersection of the gimbal pivot axes as its center of curvature. Positioned just above the stator member is an inductor 58 of hollow semi-spherical shape that is carried by the instrument housing 44. The center of curvature of the inductor 58 is also at the intersection of the gimbal pivot axes, whereby a desired fixed small clearance exists between the stator member and the inductor 58 regardless of the tilt of the gyro casing. In this form of the invention, as in the previous forms, the center of gravity of the rotor, its casing and connected parts, including the mercury pots and stator, is preferably balanced about the horizontal gimbal pivot axes.

A three-phase A. C. supply 60, 61 and 62 is shown for energizing the stator poles, the arrangement being such that when a mercury pot contact is closed a current is supplied to a pole positioned in quadrature, i. e., 90° removed from the pot making contact. Thus, assuming that the gyro tilts so that pot or switch 47 makes contact, supply current may be traced from lead 61 to lead 63, lead 64 through pot 47 to the winding on pole 55 removed 90° from pot 47, and thence by way of leads 65 and 66 back to supply lead 62. From an inspection of Fig. 6 it will be noted that the windings of the four outside poles 53 to 56 are adapted to be energized from phase leads 35 61—62 when their respective pot switches make contact, whereas the winding of the center pole 57 is continuously energized from phase leads 60—62, whereby the phase of the current in the center pole winding is displaced 120° from that of the other windings so that when one of the outside pole windings is energized, a moving field is produced passing between such outside pole winding and the center pole winding. Thus, if the gyro tilts so that pot 47 is low, the winding of outside pole 55 becomes energized and cooperates with the winding of center pole 57 to produce a moving field that induces currents in the relatively stationary inductor 58, resulting in motor action causing a reaction or force on the stator 51 acting at right angles to the direction of the tilt, thereby serving to precess the gyro back to the vertical.

Thus, regardless of which way the gyro tilts, a corrective force is applied for precessing the same to the vertical. At times two of the pots will be depressed and make contact at the same time, resulting in two moving magnetic fields, the resultant of which serves to properly precess the gyro. It will be apparent that the precessing force may be varied as in the previous forms of the invention, by varying the current supply to the pole windings. Thus resistances may be incorporated in the contact wires in the pots 46 to 49 or elsewhere, so that as a pot descends and the mercury rises, the resistance in the circuit is decreased.

A sweeping or moving magnetic field may be obtained in other ways than by having the central pole winding energized in out of phase relation with respect to the outer poles. Thus, in Fig. 7, the stem 52' of the stator 51' is shown provided with a winding 68 energized from single phase leads 69 and 70. The mercury contact pots 46' to 49' are carried by the rotor bearing casing in the same manner as illustrated in Fig. 6, though for simplicity in the drawings, portions of the structure of Fig. 6 are omitted in Fig. 7. Each of the contact pots is respectively connected in circuit with a shading coil surrounding an outer pole spaced 90° from the respective pot. Thus, pot 47' is in circuit with a shading coil on pole 55', whereby when the gyro casing tilts so that the mercury closes the contacts in pot 47', the coil on pole 55' is short-circuited, causing a retarding of the time phase of the portion of the flux passing out of pole 55', whereby a sweeping of the flux from pole 57' to pole 55' is obtained, which flux, on cutting the inductor 58 (not shown in Fig. 7) induces currents which, in turn, produce a force on the stator at right angles to the tilt, thereby serving to precess the gyro to the vertical as is desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. Thus, it will be apparent that the erecting force may be varied within wide limits not only by varying the current supply to the stator members, but the amount of beveling of the stator ring in the forms of the invention of Figs. 1 and 4 will materially affect the erecting force for various displacements so that almost any erecting force-displacement curve that is desired may be obtained.

Having described our invention, what we claim and desire to secure by Letters Patent is:

1. In a device of the character described, a gyroscope having a rotor normally rotated about a vertical axis, a support, and electrical means causing, upon the tilting of said gyroscope rotor, precession of the same back to the vertical, said electrical means comprising inductively related relatively movable members carried respectively by said gyroscope and by said support, one of said members electrically producing a moving flux field and the other of said members cutting said field for producing a torque about a horizontal axis of said gyroscope rotor at right angles to the horizontal axis about which the tilt occurred.

2. In combination, a gyroscopic rotor, a casing therefor mounted for oscillation about a horizontal axis, a member for electrically producing a moving magnetic field, a second member inductively associated with said first named member, means for connecting one of said members to said casing, and means for supporting the other of said members so that the same is movable in response to the action of gravity, whereby, upon the tilting of said rotor, the electromagnetic reaction between said members serves to precess said rotor back to the vertical.

3. In a gyroscope, a gyro rotor and rotor bearing casing, means for supporting the same for oscillation about horizontal axes in substantially neutral equilibrium and with the rotor having a normally vertical spin axis, and gravitationally responsive means for maintaining said spin axis erect without imparting pendulosity to the casing, including stator and inductor members, said stator member being arranged for producing a moving magnetic field for cutting said inductor member along an annular path concentric with said vertical spin axis, one of said members being pendulously supported about said horizontal axes while the other of said members is carried by said casing, whereby said annular path becomes eccentric to the spin axis upon the tilting of said gyro rotor so that an erecting torque is exerted upon said casing at right angles to the plane of the tilted gyro spin axis and the vertical in the direction to precess the gyro rotor to the vertical.

4. In a gyro vertical, a gyroscope including a rotor casing having means for supporting the same on horizontal axes in substantially neutral equilibrium and with its rotor having a normally vertical spinning axis, a stator member pendulously supported from said axes independently of said rotor, said stator member having winding means thereon for producing a rotating magnetic field having a path concentric with the vertical spinning axis of said rotor, an inductor ring carried by said casing coincident with the path of said magnetic field when said spinning axis is vertical, said inductor ring moving eccentrically to said path to be looped by said magnetic field upon the tilting of said spinning axis, whereby currents induced in said inductor ring act to produce a torque on said casing to precess said rotor directly to the vertical.

5. In a device of the character described, a gimbal mounted gyroscope for maintaining a definite reference plane, said gyroscope having a rotor and a rotor bearing casing, a support, means for electrically producing a moving magnetic flux field, means inductively coupled to said flux producing means, one of said means being carried by said casing and the other of said means being carried by said support, said one means being arranged for relative movement with respect to the other, the tilting of said gyroscope from said reference plane producing an electromagnetic force between said two means action to precess said gyroscope back to said reference plane.

6. In a gyroscopic horizon, a gyroscope for maintaining a horizontal reference plane, said gyroscope having a rotor and a rotor bearing casing, a universal support for said gyroscope, means for electrically producing a moving magnetic flux field, means inductively coupled to said flux producing means, one of said means being carried by said casing, a gravitationally controlled device pivoted on said support for carrying the other of said means, said one means being arranged for relative movement with respect to the other, the tilting of said gyroscope producing an electromagnetic force between said two means acting to precess said gyroscope back to the horizontal.

7. A gyroscope having a rotor and rotor bearing casing and being particularly adapted for an artificial horizon or vertical, said gyroscope having a gimbal mounting and means for electrically producing a moving magnetic flux field including a stator member and a coupled inductor member, and a support carried by said gimbal mounting, one of said members being carried by said support and the other by said rotor bearing casing and arranged, on angular displacement of the spin axis from desired direction, to produce an erecting torque on the gyroscope due to the action of a continuously moving magnetic field produced by said stator member during the period of displacement.

8. A gyroscope having a rotor and rotor bearing casing and being particularly adapted for an artificial horizon or vertical, said gyroscope having a gimbal mounting and means for electrically producing a moving magnetic flux field including a stator member and a coupled inductor member, a support carried by said gimbal mounting, one of said members being carried by said support and the other by said rotor bearing casing and arranged, on angular displacement of the spin axis from desired direction, to produce an erecting torque on the gyroscope due to the action of a continuously moving magnetic field produced by said stator member during the period of displacement, and means for varying the current through said field producing means to thereby vary the rate of erection of the gyroscope.

9. In a gyro vertical, a rotor and rotor bearing casing, means for universally supporting the same about horizontal axes substantially in equilibrium, a gravitationally responsive device for maintaining the casing horizontal, torque applying means acting between said casing and the gravitational device upon relative tilt thereof for applying a torque to the casing at right angles to said tilt, and means for regulating the magnitude of said torque to vary the rate of erection.

10. In a gyro vertical, a rotor and rotor bearing casing, means for universally supporting the same about horizontal axes substantially in equilibrium, a gravitationally responsive device for maintaining the casing horizontal, electrical torque applying means acting between said casing and the gravitational device upon relative tilt thereof for applying a torque to the casing at right angles to said tilt, and means for varying the exciting current of said torque means for varying the rate of erection.

11. In a device of the character described, a gyroscope having a rotor normally rotated about a vertical axis, a support, electrical means causing, upon the tilting of said gyroscope rotor, precession of the same back to the vertical, said electrical means comprising inductively related relatively movable members carried respectively by said gyroscope and by said support, one of said members electrically producing a moving flux field and the other of said members cutting said field for producing a torque about a horizontal axis of said gyroscope rotor at right angles to the horizontal axis about which the tilt occurred, and means for varying the exciting current of said electrical means for varying the rate of erection.

ORLAND E. ESVAL.
CARL A. FRISCHE.